United States Patent [19]
Byrne et al.

[11] 3,885,260
[45] May 27, 1975

[54] BEEHIVE FRAME

[75] Inventors: Neil C. Byrne, Mount Colah; John R. Cullen, North Ryde; Richard G. Parker, Camden; Harry L. Davis, Camden, all of N.S.W., Australia

[73] Assignee: International Standard Electric Corporation, New York, N.Y.

[22] Filed: Nov. 16, 1973

[21] Appl. No.: 416,515

[30] Foreign Application Priority Data
Nov. 24, 1972 Australia................ 1356/72

[52] U.S. Cl.................................. 6/2 R; 6/10
[51] Int. Cl.................................. A01k 47/02
[58] Field of Search.............. 6/2 R, 2 A, 10, 11

[56] References Cited
UNITED STATES PATENTS

| | | | |
|---|---|---|---|
| 1,722,169 | 7/1929 | Yater | 6/10 |
| 1,992,664 | 2/1935 | Hanson | 6/10 |
| 2,333,840 | 11/1943 | Brewer et al. | 6/10 |
| 2,681,458 | 6/1954 | France | 6/2 R |
| 2,717,432 | 9/1955 | Willard | 6/10 X |
| 3,187,353 | 6/1965 | Ackerman | 6/10 |
| 3,579,676 | 5/1971 | Pierce | 6/10 |

*Primary Examiner*—Robert Peshock
*Assistant Examiner*—J. Q. Lever
*Attorney, Agent, or Firm*—Thomas L. Peterson

[57] ABSTRACT

A beehive frame comprising two identical interlockable half-sections. Each section has several frame strengthening lugs in the top and bottom which intermesh when the frame is assembled. The sides have several V-slotted protrusions which accommodate and lock in the wire which forms the support for the wax foundation.

10 Claims, 2 Drawing Figures

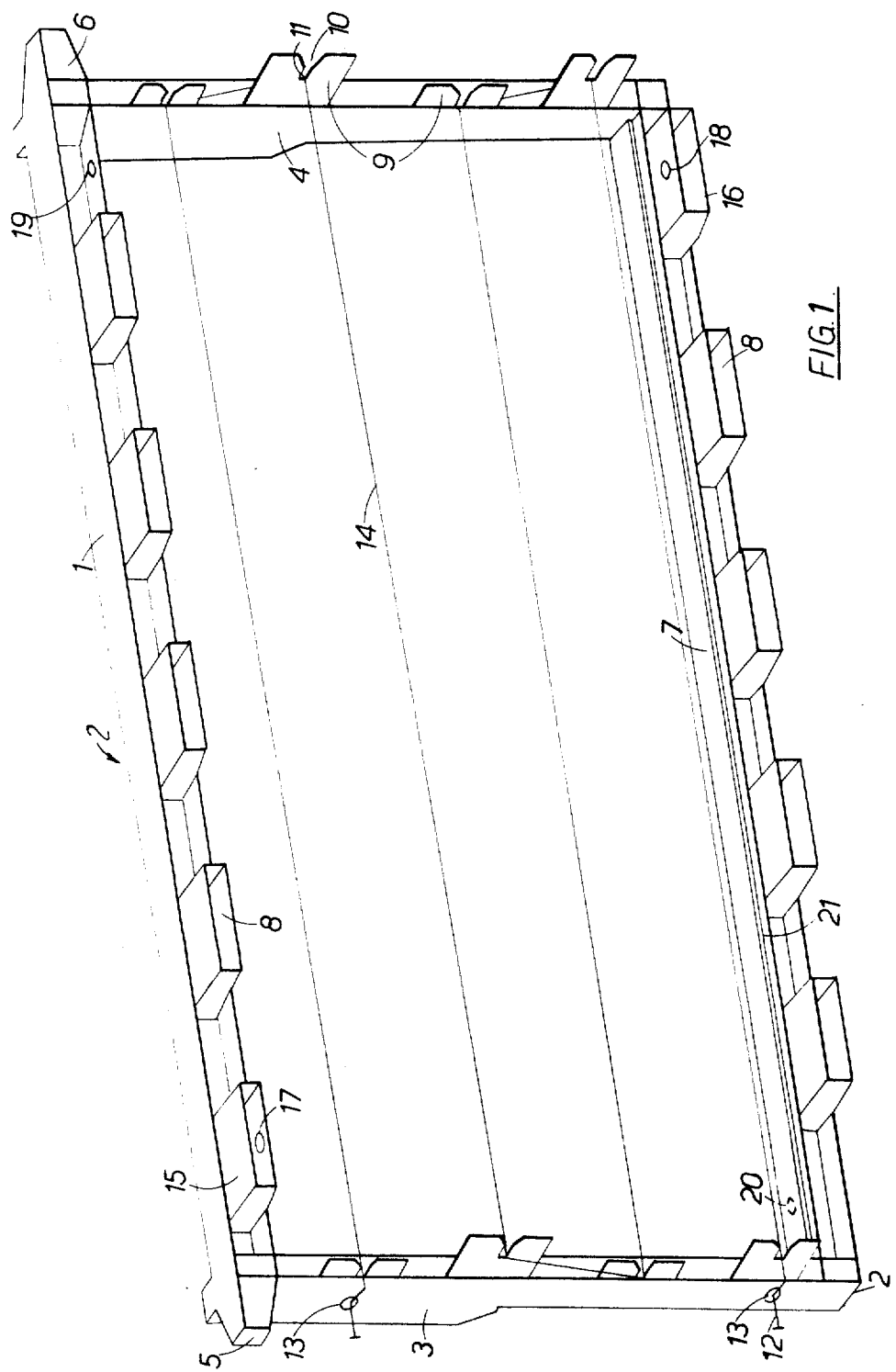

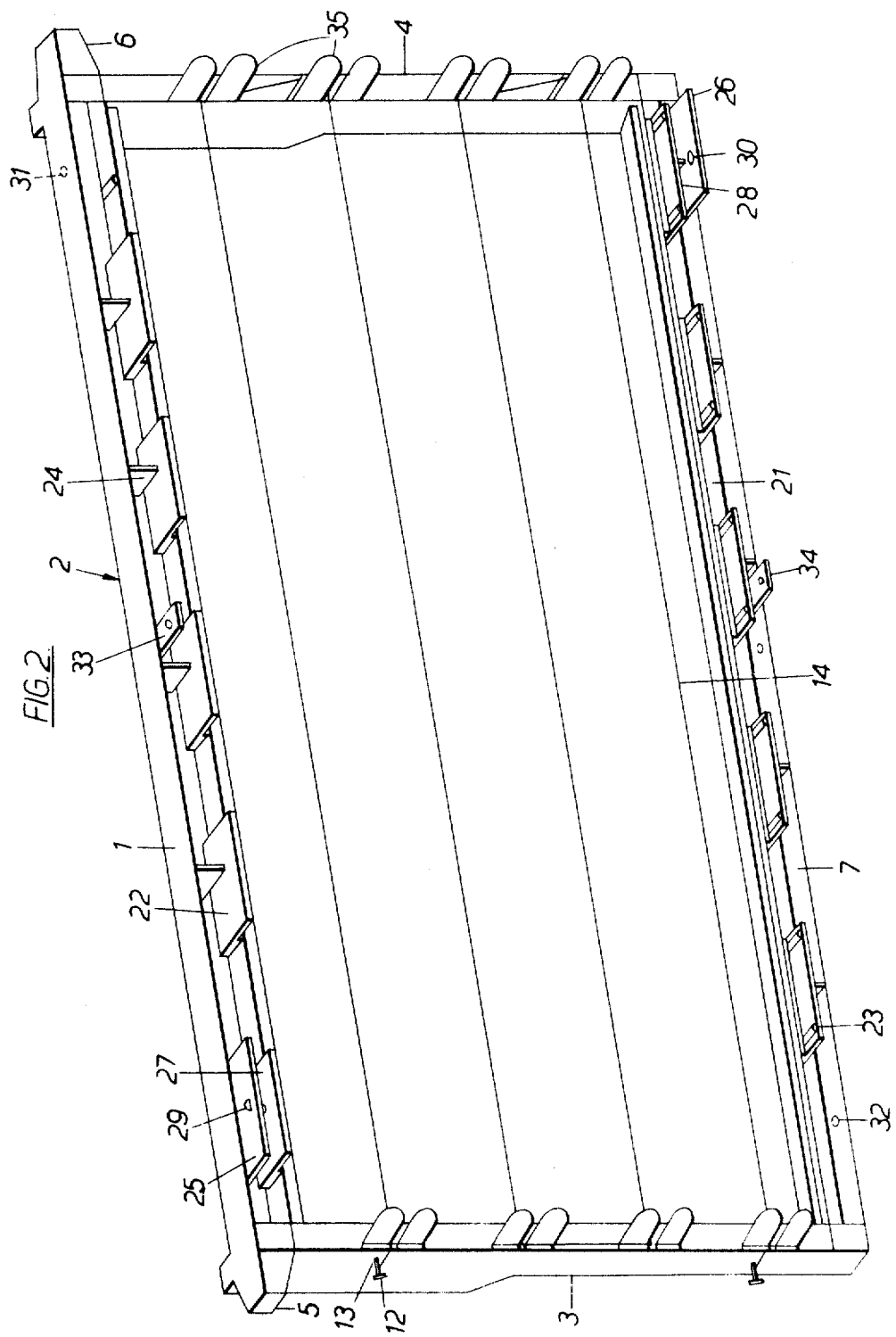

BEEHIVE FRAME

This invention relates to beehive frames for insertion into beehives.

The type of beehive frame in general use is the Victorian pattern frame which is usually fabricated from precut timber pieces consisting of top and bottom bars and two end bars. This type of frame, as indeed all timber frames, suffers from several disadvantages, namely:
1. the timber warps with usuage,
2. the pieces become porous when boiled in water which allows infestation of wax moth larvae,
3. the frame becomes chipped and scarred when scraped with a blade during the cleaning process,
4. the frame has to be assembled and rewired after each use which is a time-consuming process,
5. the serviceable life is often limited to one season or even less, and
6. the timer is affected by dry rot and white ant attack.

In order to overcome the above disadvantages, attempts have been made to mold beehive frames out of polymerised plastics. Such a plastic frame is described, for example, in Australian Pat. Specification No. 145,502. It has been found, however, that such frames can be costly items and also that bees may not accept plastic honeycomb foundations as suitable material' upon which to build.

The present invention not only overcomes the disadvantages of the existing timber frames but also overcomes the problems encountered with earlier attempts to provide serviceable plastic frames. Further, the invention provides a frame which has an extended serviceable life, greatly reduces the time involved in preparing it for re-use and yet is favorably comparable in cost to that of the timber beehive frame.

SUMMARY OF THE INVENTION

According to the principal aspect of the present invention there is provided a beehive frame comprising two similar rectangular half-sections which can be detachably secured together in a common plane of the two sections. Each half-section comprises elongate top, bottom and wall sides. A plurality of lugs extend from the top and bottom sides and through said plane. The lugs intermesh when the half-sections are mounted together. A plurality of protrusions extend from the wall sides through said plane which accommodate and lock in the wire which forms the support for the wax foundation. Means detachably secures the two half-sections together along said plane.

BRIEF DESCRIPTION OF THE DRAWINGS

FIG. 1 is a schematic representation of a half-section of one embodiment of the beehive frame of the present invention; and FIG. 2 is a schematic representation of a beehive frame half-section according to a second embodiment of the invention.

DESCRIPTION OF THE PREFERRED EMBODIMENTS

Referring now to the drawings in detail, wherein like reference characters designate like or corresponding parts in the two views, FIG. 1 shows one half-section 2 of the beehive frame of the invention, which consists of two identical rectangular half-sections molded from a plastic material. By plastic material, reference is made to any of the families of polymerised compounds such as polycarbonates, polyvinyls, polyolefins, polyacetates, polyethylenes and the like although the polycarbonates would be the preferred family. The molding may be achieved by standard processes such as injection or pressure molding. Each half-section is integrally fabricated as one unit with each side formed in U-shaped cross-section, although other cross-sectional configurations may be employed.

In the drawings the upper or top side 1 of the half-section 2 is extended beyond the sides 3 and 4 by means of flanges 5 and 6, respectively. The flanges enable the assembled frame to be suspended within a hive in a vertical position. The frame also includes a bottom side 7. Located within the U-section of the top side 1 and bottom side 7 are a number of rectangularly or trapezoidally-shaped lugs 8 which extend beyond the inner face or plane of the half-section 2. The lugs are so arranged as to engageably mate in an interlacing fashion with those of another half-section when the two half-sections are brought together with their inner faces touching.

Disposed within the U-sections of sides 3 and 4 is an even number of lamina protrusions 9 of substantially rectangular shape with shallow V-shaped cutouts 10 terminating in longitudinal slots 11. All alternate lamina protrusions 9 are of the same length as each other but each protrudes approximately twice as far beyond the inner face of the half-section 2 as its adjacent neighbors. Moreover, as shown, the longer protrusions on side 4 are formed on the right-hand inner side of the U-section whereas the short ones are formed on the left-hand side of the U-section. The protrusions formed in side 3 are identically located in the same right-and left-hand fashion. Thus, during the preparation for use of the frame, a wire 14 is threaded longitudinally across the half-section and is located in and retained by the slots 11 being terminally secured by looping around, for example, nails 12 embedded in holes 13.

In the assembly of a complete frame from two half-sections, the wire 14 is threaded through one half-section only and is locked in position by the slots 11 of the other half-section. The protrusions 9 may be of lamina thickness up to approximately half the gap width of the U-section.

Formed in at least the end lugs 15 and 16 in sides 1 and 7, respectively, are holes 17 and 18. When the complete frame is formed these holes lockably engage spherically formed detents or lugs 19 and 20 (in the well known fashion of a ball-and-socket snaplock mechanism) which rigidly hold the half-sections together. Structural rigidity is aided by the intermeshing action of the lugs 8. It will be appreciated that the locking mechanism may be incorporated into more than two of the lugs 8 and indeed into all of them if desired.

The completed frame is intended for use with a wax foundation (not shown) which is located in recess 21 on the inside wall of side 7 and in a similar recess (not visible) on side 1. The foundation is secured in the frame by known methods such as electrical heating of wire 14. However, it would be within the invention to provide a plurality of cross members connecting opposite sides of the half-section and formed integrally with it. This arrangement would allow the bees to commence a wax foundation which they would ultimately build across the inner area of the frame. However, this procedure is generally considered by the commercial apiarist to be economically disadvantageous since it delays the active time spent by the bees in honey production and storage.

In the second embodiment of the invention shown in FIG. 2, the lugs 8 of the first embodiment are replaced with substantially rectangular lamina protrusions 22 formed on the lower inner face of the U-section in the case of the top side 1 and on the upper inner face of the U-section in the case of the bottom side 7. As seen in FIG. 2, these protrusions are dimensioned and located in an effectively identical fashion to that of the lugs in FIG. 1. As shown, each protrusion is formed on the inner side face of its U-section but is elevated above that face by approximately its own thickness. Molded into and toward each end of the protrusions are detents or ribs 23 which provide a stressing force against the matching inner surface of the U-section of the corresponding frame half-section when assembled. This arrangement provides further rigidity to the assembled frame as do the cross-strips 24 molded between the protrusions 22 and the opposite inner face of its U-section. Additionally, as shown, further protrusions 25 and 26 are provided opposite the top left-hand and bottom right-hand protrusions 27 and 28, respectively. These integers 25 and 26 extend further than their opposite members 27 and 28 and they carry holes 29 and 30 corresponding to the holes 17 and 18 in FIG. 1. Matching locking lugs or detents corresponding to lugs 19 and 20 of FIG. 1 are provided as shown at 31 and 32. Further ball-and-socket snaplock mechanisms may be located on the half frame as for example at 33 and 34 in FIG. 2.

The lamina protrusions 9 of FIG. 1 are replaced in FIG. 2 by similar protrusions 35, the only differences being that they are of equal height and that those formed on the outer face of the side U-sections are spaced above that side face by a distance equal to their thickness. This enables the emplaced wire to be wholly contained within the side U-sections. Cross-strips may also be provided in the side walls, similar to cross-strips 24, to provide additional rigidity.

It is possible to use materials other than plastics in the construction of the frame but generally these would be considered uneconomical. For example, the various sections of the frame could be extruded from aluminum and pre-assembled by known techniques.

What is claimed is:

1. A beehive frame comprising two similar rectangular half-sections adapted to be secured together in a common plane of said half-sections, each said half-section comprising elongate top, bottom and wall sides, a plurality of spaced lugs extending from said top and bottom sides and through said plane, a plurality of protrusions extending from said wall sides through said plane, said protrusions being laminaly formed, each of said protrusions having a slot formed therein extending to said plane, and means to detachably secure the two sub-frames together along said plane.

2. A beehive frame as set forth in claim 1 wherein said lugs of each half-section are so dimensioned and located as to interlace in firm contact with corresponding lugs of the other half-section.

3. A beehive frame as set forth in claim 1 wherein each wall side is of U-shaped cross-section and said protrusions extend alternately from the interior inner and interior outer sides of the U-section, respectively.

4. A beehive frame as set forth in claim 3 wherein each protrusion in one side wall is as equally distanced relative to said top wall as its corresponding protrusion in the other side wall such that pairs of corresponding protrusions have their said slots coincident with each other when the half-sections are secured together.

5. A beehive frame as set forth in claim 1 wherein said top and bottom sides are of U-shaped cross-section and said lugs are substantially rectangularly or trapezoidally shaped and of a width equal to the internal width of said U-shaped section.

6. A beehive frame as set forth in claim 1 wherein the top and bottom sides are of U-shaped cross-section and said lugs are laminaly formed on the inner interior face of the U-shaped section.

7. A beehive frame as set forth in claim 6 wherein at least one additional laminaly-formed lug is provided on the outer interior face of each U-section, and said means comprises in each half-section a hole formed in one side of at least one said additional lug and a detent corresponding to each said hole formed on the outer interior faces of said U-sections.

8. A beehive frame as set forth in claim 1 wherein said top and bottom sides are of U-shaped cross-section and in which said means comprises in each half-section a hole formed in one side of at least one lug in each of said top and bottom sides and a detent corresponding to each of said holes on the inner interior face of said top and bottom U-sections such that each detent is snap-lockable into the corresponding hole of the other half-section.

9. A beehive frame comprising two similar rectangular half-sections removably secured together in a common plane of said half-sections, each said half-section comprising elongate top, bottom and wall sides, said top and bottom sides being of U-shaped cross-section defining elongate slots opening at said plane, a plurality of substantially rectangularly or trapezoidally shaped lugs disposed in said slots and extending through said plane, said lugs being spaced apart in staggered relationship in said half-sections so as to interlace in firm contact with each other when said half-sections are secured together at said plane, the ends of the lugs in each half-section extending into the recesses defined by the lateral edges of the spaced lugs and the walls of the slot in the other half-section.

10. A beehive frame as set forth in claim 9 including a plurality of protrusions on each said half-section extending from said wall sides through said plane, each protrusion having a slot therein extending to said plane.

* * * * *